US007428259B2

(12) United States Patent
Wang et al.

(10) Patent No.: US 7,428,259 B2
(45) Date of Patent: Sep. 23, 2008

(54) EFFICIENT AND FLEXIBLE GPS RECEIVER BASEBAND ARCHITECTURE

(75) Inventors: Hansheng Wang, San Jose, CA (US); Chi-Shin Wang, Half Moon Bay, CA (US)

(73) Assignee: Sirf Technology Holdings, Inc., San Jose, CA (US)

( * ) Notice: Subject to any disclaimer, the term of this patent is extended or adjusted under 35 U.S.C. 154(b) by 347 days.

(21) Appl. No.: 11/123,861

(22) Filed: May 6, 2005

(65) Prior Publication Data

US 2006/0251173 A1    Nov. 9, 2006

(51) Int. Cl.
*H04B 1/00*    (2006.01)
(52) U.S. Cl. ...................................... 375/142
(58) Field of Classification Search .................. 375/142
See application file for complete search history.

(56) References Cited

U.S. PATENT DOCUMENTS

| 4,578,678 | A | 3/1986 | Hurd | 343/357 |
|---|---|---|---|---|
| 4,651,154 | A | 3/1987 | Wong et al. | 342/356 |
| 4,689,626 | A | 8/1987 | Hori et al. | 342/357 |
| 4,807,256 | A | 2/1989 | Holmes et al. | 375/97 |
| 5,185,618 | A | 2/1993 | Park | 346/138 |
| 5,192,957 | A | 3/1993 | Kennedy | 342/357 |
| 5,271,034 | A | 12/1993 | Abaunza | 375/1 |
| 5,402,442 | A | 3/1995 | Ishigaki | 375/200 |
| 5,504,684 | A | 4/1996 | Lau et al. | 364/443 |
| 5,535,237 | A | 7/1996 | LaPadula, III et al. | 375/200 |
| 5,847,678 | A | 12/1998 | Tachita | 342/357 |
| 5,877,724 | A | 3/1999 | Davis | 342/357 |
| 6,067,328 | A | 5/2000 | Lewellen et al. | 375/316 |
| 6,067,614 | A | 5/2000 | Goto | 712/36 |

(Continued)

FOREIGN PATENT DOCUMENTS

WO    WO/2004/017089    *   2/2004

OTHER PUBLICATIONS

Onodera, K.; Gray, P.R.,"A 75mW 128 MHz DS-CDMA Baseband Correlator For High-speed Wireless Applications", VLSI Circuits, 1997. Digest of Technical Papers., 1997 Symposium on Jun. 12-14, 1997 pp. 117-118.*

(Continued)

*Primary Examiner*—David C. Payne
*Assistant Examiner*—Nader Bolourchi
(74) *Attorney, Agent, or Firm*—Orrick Herrington & Sutcliffe LLP

(57) ABSTRACT

The present invention provides a new baseband integrated circuit (IC) architecture for direct sequence spread spectrum (DSSS) communication receivers. The baseband IC has a single set of baseband correlators serving all channels in succession. No complex parallel channel hardware is required. A single on-chip code Numerically Controlled Oscillator (NCO) drives a pseudorandom number (PN) sequence generator, generates all code sampling frequencies, and is capable of self-correct through feedback from an off-chip processor. A carrier NCO generates corrected local frequencies. These on-chip NCOs generate all the necessary clocks. This architecture advantageously reduces the total hardware necessary for the receiver and the baseband IC thus can be realized with a minimal number of gate count. The invention can accommodate any number of channels in a navigational system such as the Global Positioning System (GPS), GLONASS, WAAS, LAAS, etc. The number of channels can be increased by increasing the circuit clock speed.

13 Claims, 2 Drawing Sheets

U.S. PATENT DOCUMENTS

| | | | |
|---|---|---|---|
| 6,311,129 B1 | 10/2001 | Lin | 701/214 |
| 6,330,274 B1* | 12/2001 | Uehara | 375/150 |
| 6,421,372 B1 | 7/2002 | Bierly et al. | 375/143 |
| 6,480,150 B2 | 11/2002 | Falk et al. | 342/357.12 |
| 6,526,322 B1 | 2/2003 | Peng et al. | 700/5 |
| 6,646,595 B1 | 11/2003 | Heng et al. | 342/357.06 |
| 6,724,807 B1 | 4/2004 | Krasner et al. | 375/143 |
| 6,831,911 B1 | 12/2004 | Sridharan et al. | 370/345 |
| 6,845,124 B2 | 1/2005 | Mattos et al. | 375/150 |
| 7,064,707 B2* | 6/2006 | Martin | 342/357.02 |
| 2002/0012387 A1 | 1/2002 | Shakeri et al. | 375/150 |
| 2002/0113734 A1 | 8/2002 | King | 342/357.13 |
| 2004/0252049 A1 | 12/2004 | Vantalon et al. | 342/357.06 |
| 2005/0248483 A1* | 11/2005 | Martin | 342/357.02 |
| 2006/0107008 A1* | 5/2006 | Ghanem et al. | 711/163 |

OTHER PUBLICATIONS

Gregory W. Heckler et al., "Architecture of a Reconfigurable Software Receiver," ION GNSS, 2004, pp. 947-955.

Katsuyuki et al., "A high performance GPS solution for mobile use," ION GPS 2002, pp. 1648-1655.

Philip G. Mattos, "Palinuro . . . A single chip GPS Receiver—RF, DSP, CPU, ROM, RAM, All in one piece of silicon," ION GNSS, 2004, pp. 1501-1506.

Geraint et al., "Navajo GPS ASIC The Ultimate single chip baseband," ION GNSS, 2004, pp. 1488-1493.

Dennis M. Akos et al., "Global Positioning System Software Receiver (gpSrx) Implementation in low Cost/Power Programmable Processors," ION GPS 2001, Sep. 11-14, 2001, Salt Lake City, UT, pp. 2851-2858.

* cited by examiner

EFFICIENT AND FLEXIBLE GPS RECEIVER BASEBAND ARCHITECTURE

BACKGROUND OF THE INVENTION

1. Field of the Invention

This invention relates generally to navigational signal receivers. More particularly, it relates to a new baseband integrated circuit architecture for direct sequence spread spectrum (DSSS) communication receivers.

2. Description of the Related Art

Satellite-based radio navigation systems have become widely adopted in many commercial and military applications. Exemplary systems in operation or development include the NAVigation Satellite Timing and Ranging Global Positioning System (NAVSTAR GPS), the Global'naya Navigatsionnaya Sputnikovaya Sistema (GLONASS), an European satellite navigation system called GALILEO, the wide area augmentation system (WAAS), and the local area augmentation system (LAAS). These systems permit a user with an appropriate direct sequence spread spectrum (DSSS) signal receiver to determine his or her position with respect to the Earth. Direct Sequence Spread Spectrum is a modulation technique where a pseudorandom noise sequence directly phase modulates a data-modulated carrier. The DSSS signal has a noise-like spectrum and appears to be noise to all but the intended receiver As an example, the GPS constellation has 24 operational satellites. These satellites are positioned in six different orbital planes such that at any time a minimum of six and a maximum of eleven satellites are visible to any user on the surface of the Earth, except in the polar region. The satellites operate in near circular 20,200 km (10,900 nm, or about 12,000 miles) orbits at an inclination angle of 55 degrees and with approximately a 12-hour period.

Each satellite contains at least one atomic clock and transmits a navigation message that contains an accurate system time and its orbital position referenced to the atomic clock. The navigation message also contains clock behavior, status messages, and correction data such as ionospheric delay, time offset, etc. An almanac that gives the approximate data for each active satellite is also provided.

Each satellite transmits on two L-band frequencies: L1=1575.42 MHz and L2=1227.6 MHz. Three sets of pseudorandom noise (PRN or PN) ranging codes are in use: the coarse/acquisition (C/A) code, the precision (P) code, and the Y-code.

The C/A code set, also known as Gold code, has a 1.023 MHz chip rate. In spread spectrum technology, the term "chip" refers to a single bit of a pseudorandom sequence (PN-sequence) and the term "chip rate" refers to the rate at which bits of a PN-sequence are shifted. The Gold code therefore has a length of 1023. The term "code" refers to the binary bit stream (the pseudorandom sequence) used to spread a signal over a wide range of frequencies for transmission. This spreading improves the accuracy of position estimation. Other advantages include interference rejection and low spectral power density, i.e., the power level at a given frequency.

A correlator at a receiver despreads this signal to the original data bandwidth by correlating it with a locally generated PN-sequence identical to and in synchronization with the PN-sequence used to spread the carrier at the radio transmitter, e.g., a GPS satellite vehicle (SV). Typically, this dispreading occurs after the signal received at the antenna has been amplified and down-converted to a suitable carrier frequency, also known as the intermediate frequency (IF). The hardware section associated with the amplification, down-conversion, and analog-to-digital conversion (ADC) is called the radio frequency (RF) stage. The other section, which processes the RF stage output and generates the position, velocity, and time information, is called the baseband (BB) stage.

The sampling rate at the BB stage can be any multiple of the PN code rate. A minimum of two samples per chip (bit) is needed, which results in a minimum sampling rate of 2.046 MHz. The sampled signals are then made available in two channels, one in-phase (I) and the other in-quadrature (Q). The resulting signals are then correlated with the locally generated PN code. The local code generator is driven by a code Numerically Controlled Oscillator (NCO). The result of the correlation is sent to a processor and further processed to determine the code and carrier phase offset. The processor sends a control signal to the code NCO and the carrier NCO so that they are in alignment with the input (sampled) signal. When the incoming signal is aligned with the locally generated PN code and carrier, the data bits in the signal can be extracted. The extracted data are used in computing the satellite position and hence the receiver's position, velocity, etc.

U.S. Pat. No. 6,845,124, issued to Mattos et al., discloses a GPS receiver integrated circuit. The hardware complexity is high as this IC has 16 hardware channels. U.S. Pat. No. 6,067,328, issued to Lewellen et al., discloses a GPS receiver with a baseband detector. The baseband detector includes a NCO, but does not provide all different clock frequencies required. These and other existing baseband architectures usually contain a large number of hardware correlators. The gate count, which affects power consumption, efficiency, and performance, is therefore correspondingly high. Furthermore, in conventional baseband architectures, the NCOs are usually located off the baseband IC chip and do not adjust to the different final IF frequencies.

Clearly, there is a need in the art for a new baseband IC chip with an optimal hardware architecture that minimizes gate count, thereby increasing power efficiency and performance. The present invention addresses this need.

BRIEF SUMMARY OF THE INVENTION

The present invention provides a power efficient baseband architecture for direct sequence spread spectrum (DSSS) communication receivers. In an embodiment, the baseband section of a GPS receiver is realized in the form of an integrated circuit chip with an optimal hardware design that minimizes the number of gate count.

A key advantage of the baseband IC chip according to the invention is that it employs only one single set of on-chip code Numerically Controlled Oscillator (NCO), carrier NCO, pseudorandom number sequence (PN code) generator, and correlators for all channels in succession. The code NCO drives the PN code generator, generates all code sampling frequencies, and is capable of self-correcting through feedback from an off-chip processor. A carrier NCO generates corrected local frequencies. These on-chip NCOs generate all the clocks needed, which include three different types of clocks required by the correlators for generating the PN sequence and sampling at different rates. This arrangement reduces the total hardware requirement as compared to a large number of correlators operating in parallel.

Unlike conventional GPS receivers which can only accommodate a fixed number of channels, a GPS receiver implementing the baseband IC chip according to the invention can accommodate any number of channels. The number of channels can be increased simply by increasing the circuit clock speed.

An onboard memory stores the computed data on each channel as the processing is shifted from one channel to another. The stored data are used during the next processing of the same channel. Thus, the total number of active channels can be set to any value so as to accommodate the signals from other satellite navigation system such as the GLONASS or can be set to WAAS and LAAS reception. In an embodiment, the onboard memory is a random access memory (RAM) and can be shared with other (on- and off-chip) operations, further reducing the total memory required.

The input to this baseband section does not need to be in the I and Q form. A single path from the analog-to-digital converter (ADC) is sufficient. Thus, by setting the NCO output to the required value, any input intermediate frequency (IF) can be accommodated.

This architecture advantageously reduces the total hardware necessary for the receiver, reduces the gate count associated therewith, increases power efficiency thereof, and improves performance therefor.

Other objects and advantages of the present invention will become apparent to one skilled in the art upon reading and understanding the preferred embodiments described below with reference to the following drawings.

DETAILED DESCRIPTION OF THE INVENTION

Figure 1:
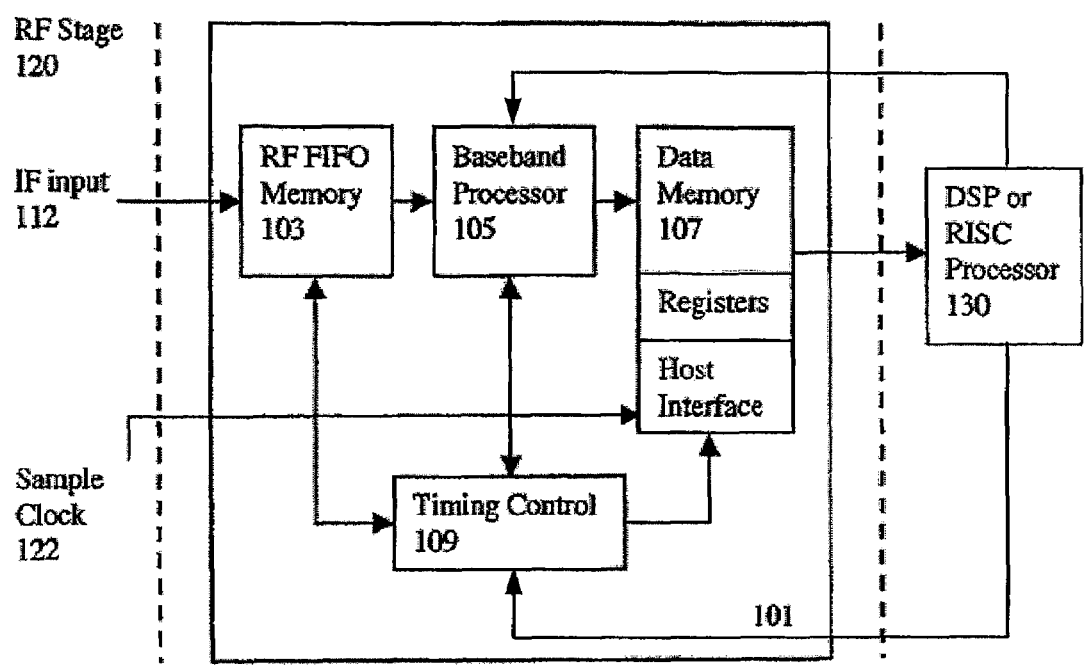
FIG. 1 is a block diagram of the GPS baseband architecture according to an embodiment of the present invention.

FIG. 1 is the functional block diagram of the baseband architecture 100 in a preferred embodiment. The baseband architecture 100 comprises a baseband chip 101 and associated off-chip functional blocks 120 and 130. The baseband chip 101 includes a host interface coupled to an off-chip sample clock 122 and an on-chip timing control 109. The IF input 112 from the RF section 120 is stored in memory 103 on the first-in-first-out (FIFO) basis. The baseband processor 105 performs correlation and processes the IF input 112 M samples at a time, where M is the number of samples in one PN-sequence.

After correlation, the resulting I and Q correlation values and other important parameters such as codephase covered, carrier frequency range examined, FIFO address, channel number are saved in a data memory means 107. Both memory 103 and data memory means 107 could be random access memories (RAMs). The parameters of the next channel are loaded and the correlation is carried out similar to the earlier channel. The computed results of the present channel are stored in the data memory means 107 prior to loading the data of the next channel. This process continues for all of the channels selected.

When all channels are processed, the channel data for all of the channels are sent to another processor 130 for further processing. Processor 130 then generates the frequency and phase corrections. These corrections are needed for the proper down-conversion and dispread operations in the baseband processor 105.

Figure 2:
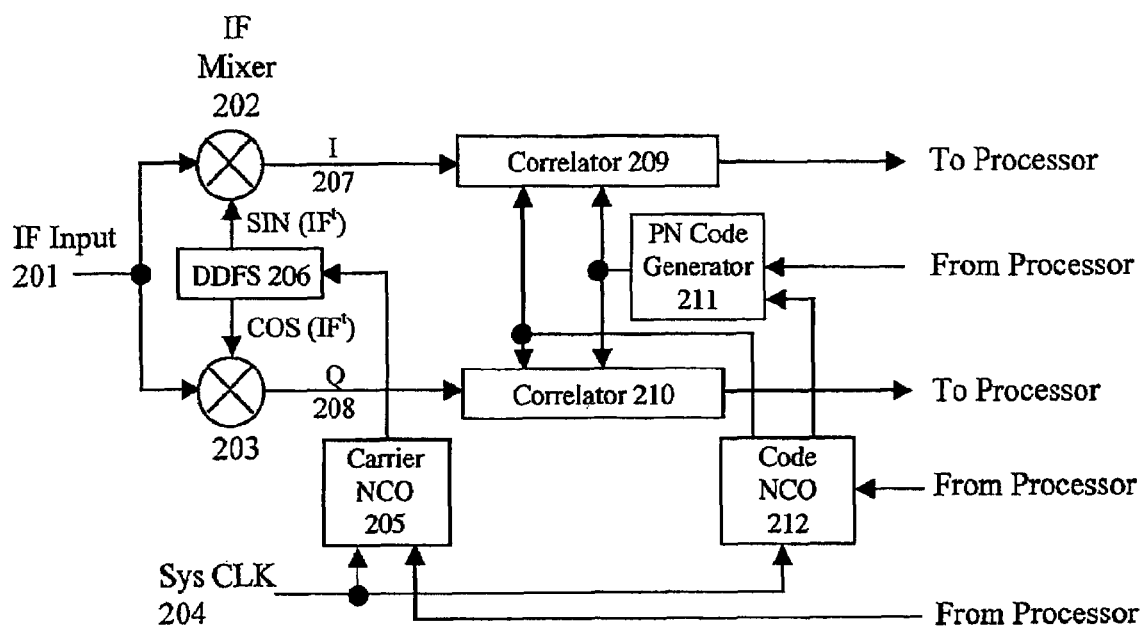
FIG. 2 schematically illustrates the baseband processor of FIG. 1.

FIG. 2 schematically shows the various functional blocks of a baseband chip 200. The IF input 201 from the RF section 120 through RF FIFO memory is multiplied with the local direct digital frequency synthesizer (DDFS) frequency in-phase, which generates the in-phase component I 207. In another path, the same input 201 is multiplied with the DDFS frequency with a phase shift of 90 degrees. The resulting signal is the quadrature component Q 208. Multipliers 202 and 203 are also called the IF mixers.

The DDFS 206 is driven by Carrier NCO 205. The Carrier NCO 205 receives the phase and frequency corrections from an outside processor, such as processor 130 of FIG. 1. Because of this correction, the DDFS frequency and phase is almost the same as that of the IF input 201. Therefore, the outputs I 207 and Q 208 of the IF Mixers 202 and 203 are stripped or wiped off from the carrier (IF). The I 207 and Q 208 may subsequently be filtered with a low pass filter to remove the high frequency components. The I and Q components are then correlated with the PN-sequence (Gold code) locally generated by PN Code Generator 211.

The PN-sequence corresponds to the channel being processed by the baseband section 200 at that time. The I path uses Correlator 209 and the Q path uses the other Correlator 210. The PN-sequence Generator 211 is driven by Code NCO 212. The local code generator frequency is made equal to the code rate of I and Q paths with corrective feedback from processor 130 to Code NCO 212. The Code NCO 212 also generates other sampling frequencies as needed by the correlators 209 and 210. The correlation outputs are then sent to processor 130 through memory, for further processing as described above.

An embodiment of the invention includes a method of time sharing a single set of correlators to acquire a plurality of GPS satellite signals or track a plurality of acquired or locked GPS satellite signals. The method comprises the following steps:

storing the samples of frequency down-converted signal in a memory;

reading the stored samples on FIFO basis and multiplying them with a carrier signal in in-phase (I) and quadrature (Q), thus forming two parallel outputs;

separately correlating the I and Q signals with locally generated replica PN code that is identical to the incoming GPS signal;

performing correlation over a fixed time interval for each GPS satellite signal and, at the end of the time period, storing the correlation results, including associated parameters such as code phase covered, carrier phase examined and memory address;

while storing the correlation results of one GPS satellite signal, loading the parameters for the next GPS satellite signal and, precisely at this time, starting the correlation for the next GPS satellite, which is also performed over a fixed time interval and which follows the same correlation process as described above.

These steps are repeated for all of the available GPS satellite signals. When all of the satellite signals are thus correlated, the stored values are transmitted to another processor, which adjusts the code NCO and carrier NCO values as required for each of the GPS signals in the next turn. A fast execution of the above steps results real time or near real time acquisition of the GPS satellite signals.

The correlators are signal processors assigned to a particular GPS signal at a given time. They might be assigned to different channels in turn. As such, any number of channels may be accommodated without any architectural changes.

In an embodiment, the baseband architecture according to the present invention is implemented in an integrated circuit for acquiring GPS satellite signals. In this case, the code NCO generates the PN-sequence at a rate appropriate for acquiring a plurality of GPS satellite signals and the carrier NCO generates the carrier signals at a rate appropriate for acquiring a plurality of GPS satellite signals.

In another embodiment, the baseband architecture according to the present invention is implemented in an integrated circuit for tracking GPS satellite signals in real time. In this case, the code NCO generates the PN-sequence at a rate appropriate for tracking the GPS satellite signals and the carrier NCO generates the carrier signals at a rate appropriate for acquiring a plurality of GPS satellite signals. In all cases, both the code NCO and the carrier NCO receive corrective feedback from an outside processor.

The baseband IC according to the present invention supports any sampling rate at the input and can be a building unit for many types of DSSS communication receivers, such as those for the GPS, GLONASS, GALILEO, WAAS, LAAS, etc. It can also be a building unit for hybrid receivers capable of acquiring and tracking a combination of these geo-positioning systems.

Although the present invention and its advantages have been described in detail, it should be understood that the present invention is not limited to or defined by what is shown or described herein. As one of ordinary skill in the art will appreciate, various changes, substitutions, and alterations could be made or otherwise implemented without departing from the principles of the present invention.

For example, the baseband IC according to the invention is not limited by the type of the outside (target) processor utilized. The target processor can be a Digital Signal Processor (DSP), a Reduced Instruction Set Computation (RSIC) processor, an Application Specific Integrated Circuit (ASIC), or a general purpose processor.

Accordingly, the scope of the present invention should be determined by the following claims and their legal equivalents.

We claim:

1. An integrated circuit (IC) chip, comprising:
a single set of on-chip baseband correlators serving all channels of a direct sequence spread spectrum (DSSS) communication receiver, wherein said set of on-chip baseband correlators are assigned to a particular GPS signal at a given time or an arbitrary number of different receiver channels;
a carrier NCO for generating corrected local frequencies;
a set of intermediate frequency (IF) signal mixers in communication with said carrier NCO and coupled to said set of on-chip baseband correlators; and
a first memory for storing a plurality of input IF samples on a first-in-first-out (FIFO) basis; wherein said set of on-chip baseband correlators are configured to process said input IF samples M samples at a time, where M represents number of said input IF samples in one PN sequence.

2. The IC chip of claim 1, further comprising: an on-chip code Numerically Controlled Oscillator (NCO) in communication with said set of on-chip baseband correlators; wherein said code NCO drives a pseudorandom number (PN) sequence generator; wherein said code NCO generates all code sampling frequencies; and wherein said code NCO is capable of self-correct through feedback from an off-chip processor.

3. The IC chip of claim 1, further comprising: a volatile memory shared by at least said set of on-chip baseband correlators.

4. The IC chip of claim 3, wherein said volatile memory is a dual-port random access memory (RAM).

5. A method of time-sharing a single set of on-chip baseband correlators, wherein said set of on-chip baseband correlators serves all channels of a direct sequence spread spectrum (DSSS) communication receiver, said method comprising the step of:
a) storing a plurality of samples of down-converted frequency signals in a first memory;
b) reading said plurality of samples from said first memory on a first-in-first-out (FIFO) basis;
c) multiplying said samples with a carrier signal via separate in-phase (I) and quadrature (Q) channel paths to generate two parallel I and Q signals;
d) separately correlating said I and Q signals with identical locally generated replica codes;
e) performing said correlating step over a fixed time interval for each DSSS signal received; and
f) storing correlation results in a second memory.

6. The method according to claim 5, further comprising: repeating steps a)-f) for all available DSSS signals.

7. The method according to claim 6, further comprising: transmitting values stored in said second memory to an off-chip processor for adjusting code Numerically Controlled Oscillator (NCO) and carrier NCO values.

8. The method according to claim 7, wherein said off-chip processor is a Digital Signal Processor (DSP), a Reduced Instruction Set Computation (RSIC) processor, or an Application Specific Integrated Circuit (ASIC).

9. A direct sequence spread spectrum (DSSS) communication receiver, comprising:
an integrated circuit (IC) chip having a single set of on-chip baseband correlators serving all channels of said direct sequence spread spectrum (DSSS) communication receiver;
an on-chip code Numerically Controlled Oscillator (NCO) in communication with said set of on-chip baseband correlators; wherein
said code NCO drives a pseudorandom number (PN) sequence generator;
said code NCO generates all code sampling frequencies; and
said code NCO is capable of self-correct through feedback from an off-chip processor;
a carrier NCO for generating corrected local frequencies; and
a first memory for storing a plurality of input IF samples on a first-in-first-out (FIFO) basis;
wherein said set of on-chip baseband correlators are configured to process said input IF samples M samples at a time, where M represents number of said input IF samples in one PN sequence.

10. The DSSS communication receiver of claim 9, wherein said DSSS communication receiver is a Global Position System (GPS) receiver, a Global'naya Navigatsionnaya Sputnikovaya Sistema (GLONASS) receiver, an European satellite navigation system (GALILEO) receiver, a wide area augmentation system (WAAS), a local area augmentation system (LAAS), or a hybrid thereof.

11. The DSSS communication receiver of claim 10, wherein
said set of on-chip baseband correlators are assigned to a particular GPS signal at a given time or an arbitrary number of different receiver channels.

12. The DSSS communication receiver of claim 9, further comprising:
a set of intermediate frequency (IF) signal mixers in communication with said carrier NCO and coupled to said set of on-chip baseband correlators.

13. The DSSS communication receiver of claim 9, further comprising:
a dual-port random access memory (RAM) shared by at least said set of on-chip baseband correlators.

* * * * *